(12) United States Patent
Perske et al.

(10) Patent No.: US 8,030,916 B2
(45) Date of Patent: Oct. 4, 2011

(54) MAGNETIC ROTARY ENCODER AND METHOD FOR ITERATIVELY ALIGNING MAGNET RELATIVE TO MAGNETIC SENSORS

(75) Inventors: Frank Perske, Graz (AT); Colin Steele, Edingburgh (GB); Marcel Urban, Fernitz (AT)

(73) Assignee: austriamicrosystems AG, Unterpremsrätten (AT)

( * ) Notice: Subject to any disclaimer, the term of this patent is extended or adjusted under 35 U.S.C. 154(b) by 371 days.

(21) Appl. No.: 11/991,983

(22) PCT Filed: Aug. 16, 2006
(Under 37 CFR 1.47)

(86) PCT No.: PCT/EP2006/008090
§ 371 (c)(1),
(2), (4) Date: Jul. 28, 2009

(87) PCT Pub. No.: WO2007/031167
PCT Pub. Date: Mar. 22, 2007

(65) Prior Publication Data
US 2010/0219815 A1    Sep. 2, 2010

(30) Foreign Application Priority Data

Sep. 12, 2005 (EP) .................................... 05019803

(51) Int. Cl.
*G01R 33/07* (2006.01)
(52) U.S. Cl. ................. 324/207.25; 324/251; 324/207.2
(58) Field of Classification Search .......................... None
See application file for complete search history.

(56) References Cited

U.S. PATENT DOCUMENTS
4,646,088 A * 2/1987 Inoue ....................... 340/870.31
(Continued)

FOREIGN PATENT DOCUMENTS
WO    WO 03/060537    7/2003

*Primary Examiner* — Huy Q Phan
*Assistant Examiner* — Trung Nguyen
(74) *Attorney, Agent, or Firm* — Cozen O'Connor

(57) ABSTRACT

A sensor system and method of operating such a sensor system for measuring an angle of rotation with an arrangement of at least four magnetic sensors (10, 11, 12, 13), at least four signal modulators (30, 31, 32, 33), each one connected to one of the magnetic sensors (10, 11, 12, 13) and having at least two control states, whereby, in a first state (+), a signal received from a sensor (10, 11, 12, 13) is output by the signal modulators (30, 31, 32, 33) and, in a second state (−), the inverse of the signal received from the sensor (10, 11, 12, 13) is output by the signal modulators (30, 31, 32, 33), a means (90) for adding the signals output by the signal modulators (30, 31, 32, 33) and a diametrically magnetized magnetic source (9). The sensor system further comprises a data output (82) and a control circuit (80) with at least one control input (81), allowing to switch the control circuit (80) into at least two different modes. In a normal mode of operation, the signal modulators (30, 31, 32, 33) are configured in such a way that a signal corresponding to the angular position of the diametrically magnetized magnetic source (9) is output to the data output. In an alignment mode of operation, the signal modulators (30, 31, 32, 33) are configured in such a way that a signal corresponding to the average magnetic field strength detected by the sensors (10, 11, 12, 13) is output to the data output (82).

12 Claims, 5 Drawing Sheets

U.S. PATENT DOCUMENTS

| | | | |
|---|---|---|---|
| 5,491,632 A * | 2/1996 | Pawlak et al. ............... | 701/1 |
| 5,500,589 A | 3/1996 | Sumcad et al. | |
| 6,433,536 B1 | 8/2002 | Yundt et al. | |
| 7,095,228 B2 | 8/2006 | Steele et al. | |
| 2002/0008513 A1 | 1/2002 | Hiligsmann et al. | |
| 2005/0088170 A1 | 4/2005 | Steele et al. | |

* cited by examiner

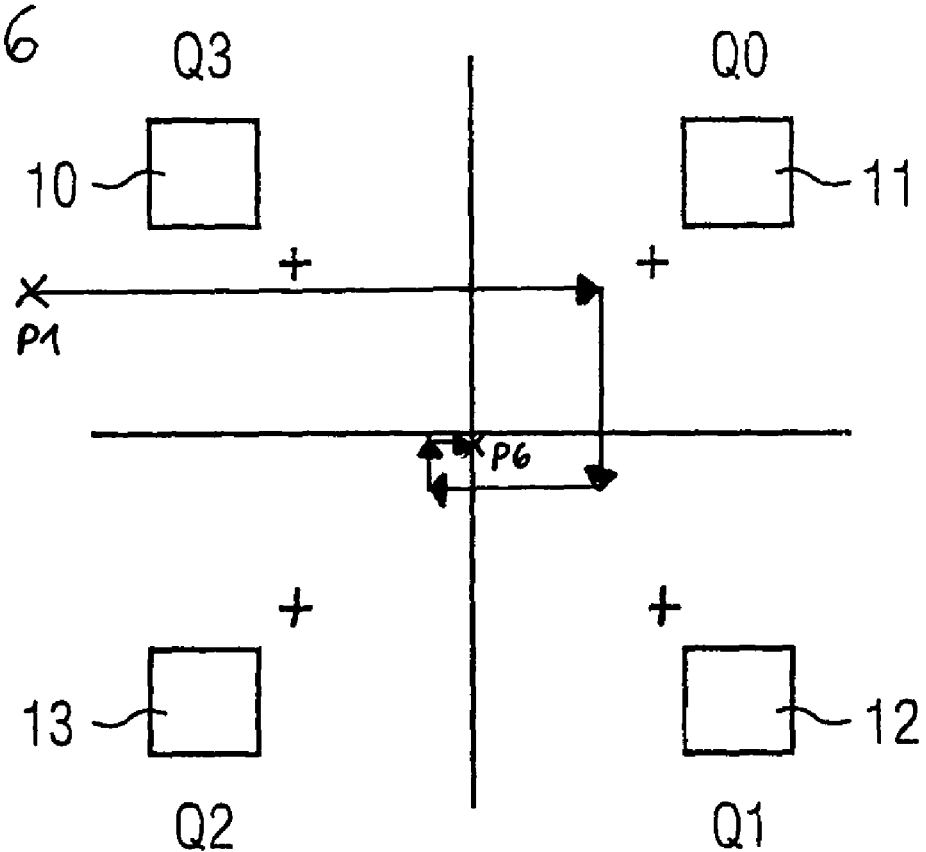

MAGNETIC ROTARY ENCODER AND METHOD FOR ITERATIVELY ALIGNING MAGNET RELATIVE TO MAGNETIC SENSORS

RELATED APPLICATIONS

This is a U.S. national stage of application No. PCT/EP2006/008090, filed on 16 Aug. 2006.

This patent application claims the priority of European patent application no. 05019803.5 filed Sep. 12, 2005, the disclosure content of which is hereby incorporated by reference.

FIELD OF THE INVENTION

The invention relates to a sensor system for measuring an angle of rotation comprising an arrangement of at least four magnetic sensors, at least four signal modulators, each one connected to one of the magnetic sensors and having at least two control states, whereby, in a first state, a signal received from a sensor is output by the signal modulator, and, in a second state the inverse of the signal received from the sensor is output by the signal modulator, a means for adding the signals output by the signal modulators, and a diametrically magnetized magnetic source placed in such a way that the magnetic field of the magnet can be sensed by the sensors.

The invention further relates to a method for operating such a sensor system.

BACKGROUND OF THE INVENTION

From the document U.S. Pat. No. 7,095,228 a sensor system and a method for operating the sensor system are known, which allow for the analysis of two- and three-dimensional magnetic field distributions. The sensor system comprises an arrangement of sensors wherein each sensor is connected to a signal modulator. By issuing appropriate control signals, the signal modulators either forward the original sensor signal or its inverse to a signal adder, which combines all signals output by the modulators to a single system signal. The content of U.S. Pat. No. 7,095,228 is hereby incorporated by reference.

Several sensors arranged in a plane can be configured in such a way as to first measure a first component of a magnetic field in a first direction of said plane and then be configured to measure a second component of the magnetic field in a second direction of that plane, preferably orthogonal to the first direction. By performing predetermined arithmetic operations on the first and second measurements the rotational angle of the magnet with respect to the location of the sensors can be computed.

FIG. 1A shows a magnet 9, which is axially symmetric with respect to the z-axis. Its magnetic axis, i.e. the axis through its North (N) and South (S) pole is aligned with the x-axis of the coordinate-system.

FIG. 1B shows a side view of the magnet 9 along the x-axis. In addition to the magnet 9 itself, its magnetic field pattern is shown using flux lines, starting at the magnet's North (N) pole and ending at its South (S) pole.

FIG. 1C shows the amplitude B of the tangential magnetic field of the magnet 9 shown in FIG. 1A. The magnetic field amplitude is zero at the center of the magnet, i.e. the z-axis, and increases linearly to the edge of the magnet. Further away from the magnet 9 the strength of magnetic field decreases rapidly with the distance from its center and approaches zero for big distances. At a particular distance x1 from the center of the magnet, the magnetic field has a value of B0.

FIG. 2 shows the magnet 9 placed in a plane with a sensor arrangement comprising four sensors 10, 11, 12 and 13, which are placed on a circle with radius x1 around the center of the magnet 9. The angle between the symmetry axis of the magnet 9, i.e. the y-axis, and a ray through the sensor 10 is denoted with $\alpha 1$, which equals 45° in the presented example. In general, the rotation of the magnet 9 with respect to the sensor arrangement is denoted with the symbol $\alpha$.

FIG. 3 shows a circuit comprising a magnetic sensor 10 and an associated signal modulator 30 according to the prior art. A magnetic sensor 10, for example a Hall sensor, measures the magnetic field by outputting a voltage proportional to the strength of the magnetic field on the two outputs 21 and 22. The measured voltage provided to the outputs 21 and 22 is converted into a current and amplified, if necessary, by a transconductance amplifier 70. The amplified output signal is provided to inputs 41 and 42 of the signal modulator 30. In order to keep FIG. 3 simple, no supply lines to the sensor 10, the transconductance amplifier 70 or the signal modulator 30 are shown.

The signal modulator 30 is used to forward the signal received from the inputs 41 and 42 to the modulator outputs 51 and 52, either unmodified or inverted. In order to invert the signal received from the inputs 41 and 42, the signal modulator 30 receives control signals from a control unit 60 which can either connect the output 41 with the output 51 and the output 42 with the output 52 or, inversely, connect the output 41 with the output 52 and the output 42 with the output 51.

For this purpose the signal modulator 30 comprises four electronic switches, e.g. transistors, which are controlled by three control signals en, p and m, which are provided by the control unit 60. The control signal en enables the signal modulator 30. If, together with the enable signal en, a signal p is provided to the control unit 60 the output signal from the inputs 21 and 22 is passed through to the outputs 51 and 52 unmodified. If however, a control signal m is provided in combination with a control signal en, then the inverted signal provided at the inputs 21 and 22 is forwarded to the outputs 51 and 52.

The sensor arrangement according to the prior art is constructed in such a way that always two sensors are arranged as a pair, canceling out errors resulting from a minor misalignment of the diametrically magnetized magnetic source.

However, in order to achieve optimal performance of the sensor arrangement it is important to align the magnetic source correctly in the middle of the sensor arrangement, i.e. it should be placed exactly in its center, with its magnetic axis parallel to the sensor plane and its rotary axis orthogonal to this plane and in the center of the magnet.

SUMMARY OF THE INVENTION

One object of the present invention is to provide an improved sensor system that allows to minimize the misalignment of a magnetic source with respect to a sensor arrangement.

It is a further object of the present invention to describe a method of operating such a sensor system in such way that the misalignment of the magnetic source can be minimized.

The object is achieved by a sensor system as described above, which further comprises a data output and a control circuit with at least one control input, allowing to switch the control circuit into at least two different modes, whereby in a normal mode of operation, the signal modulators are configured in such a way that a signal corresponding to the angular position of the diametrically magnetized magnetic source is output to the data output, and in an alignment mode of operation, the signal modulators are configured in such a way that a signal corresponding to the average magnetic field strength detected by the sensors is output to the data output.

According to an embodiment of the invention the sensor system comprises a control circuit which can be switched into at least two different modes. Apart from the normal operation mode, in which the output of the sensor system corresponds to the rotary angle of the magnet, the sensor system provides an alignment mode of operation, in which the signal modulators are configured to allow to measure the average magnetic field of all sensors.

Due to the symmetry of the diametrically magnetized magnetic source, for example a cylindrical permanent magnet, the magnetic fields measured by sensors placed symmetrically around the center of the magnet cancel each other out. In addition, the measured signal is independent from the rotary angle of the magnet. Thus, the magnetic source can be aligned with respect to the magnetic sensors, if in alignment mode the average magnetic field strength measured or its variation over a full turn of the diametrically magnetized magnetic source becomes minimal.

According to an embodiment of the invention, in alignment mode, all sensors are connected in parallel and the sensor output is added. By moving the magnet with respect to the sensor arrangement, the misalignment of the magnet can be minimized by bringing the magnet into a position where the measured total magnetic field becomes minimal.

In theory, a perfectly aligned magnet should result in a zero magnetic field at the center of the sensors. However, in practice the magnetic source and the sensors do not lie in the same plane, but in planes parallel to each other. In addition, ambient magnetic fields or minor misalignments of the magnet must be tolerated. For these reasons, in an advantageous embodiment of the present invention, the variation of the measured average magnetic field is minimized instead. If, over a full turn of the magnet with respect to the sensor arrangement, the measured magnetic field does not change or only changes insignificantly, the magnet is well aligned with respect to the arrangement of sensors.

In a further embodiment of the inventive sensor system, the sensors and the required control circuits are all integrated into a single integrated circuit. Thus, by placing such an circuit on a printed circuit board just below an axis to be monitored, a particular simple and inexpensive sensor system can be realized.

BRIEF DESCRIPTION OF THE DRAWINGS

FIG. 6 shows a trace of a magnet showing how magnet position is adjusted during alignment in a sensor plane.

DETAILED DESCRIPTION OF THE DRAWINGS

Figure 2:
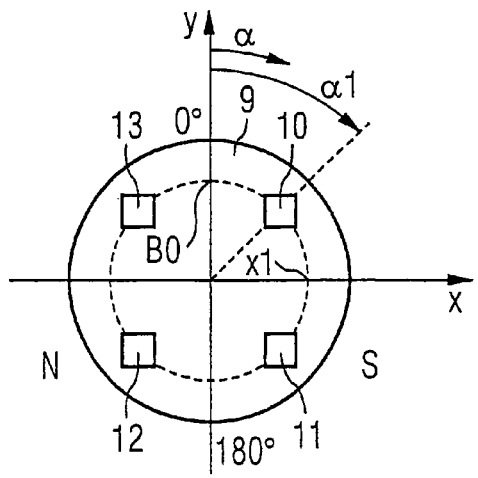
FIG. 2 shows a top view of the magnet placed in the center of a sensor arrangement with four sensors according to the prior art.

The description below is based on a sensor arrangement as shown in FIG. 2. However, variations in the particular arrangement do not change the underlying method used for alignment of the magnet 9 described in more detail below.

Though, in the particular example shown in FIG. 2, a sensor arrangement comprising four sensors 10, 11, 12 and 13 is shown for reasons of representational simplicity, any sensor configuration that is symmetric with respect to the center can be used for the present invention. For example, eight sensors could be placed on the circle with radius x1 with an angle of 45° between two neighboring sensors.

Figure 1A:
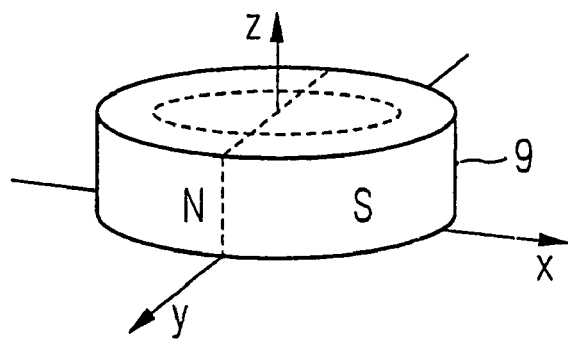
FIG. 1A shows an axially symmetric magnet.
Figure 1B:
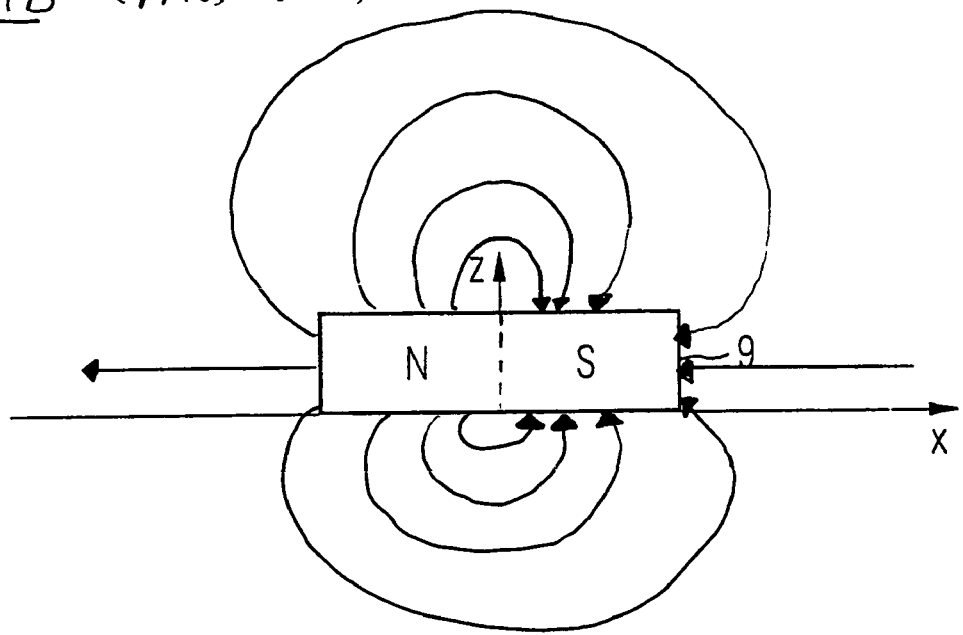
FIG. 1B shows a side view of the magnet and its magnetic field.
Figure 1C:
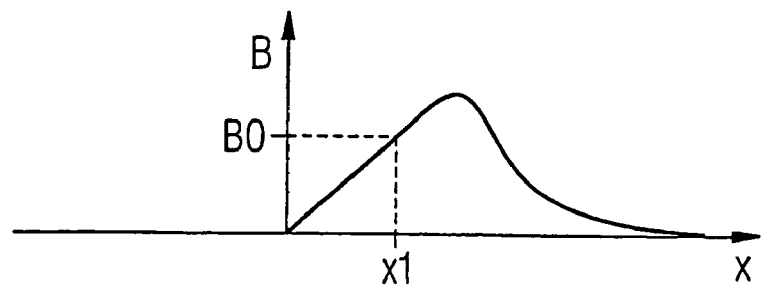
FIG. 1C shows the field strength of the tangential magnetic field of the magnet along its x-axis.

As can be seen from FIG. 2 in combination with FIG. 1B, sensors 10, 11, 12 and 13 measuring the vertical component of a magnetic field should be placed within the circumference of the magnet 9, i.e. parallel to the magnetic disc 9, while sensors measuring the horizontal component of a magnetic field should be placed outside the circumference, i.e. parallel to the z-axis.

Figure 3:
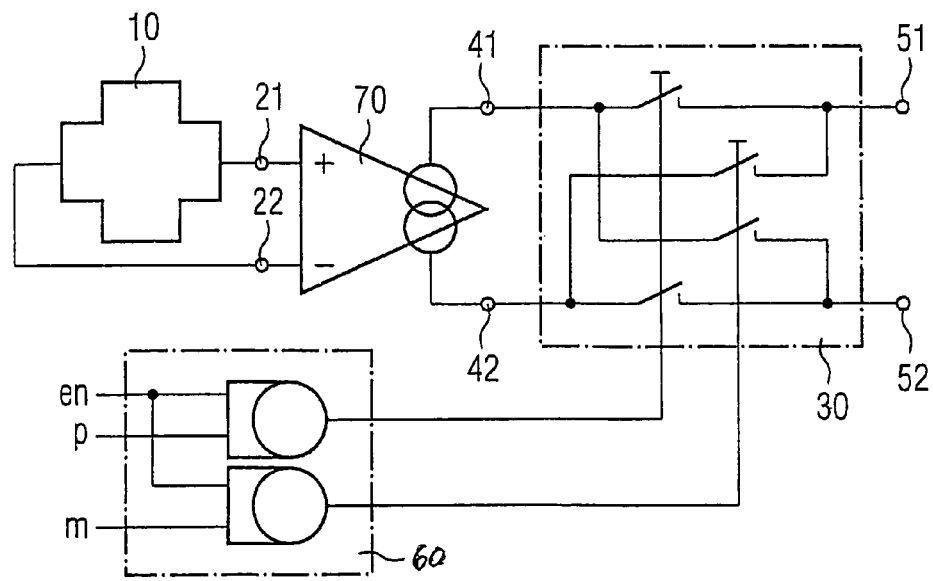
FIG. 3 shows a circuit comprising a magnetic sensor and a signal modulator according to the prior art.
Figure 4:
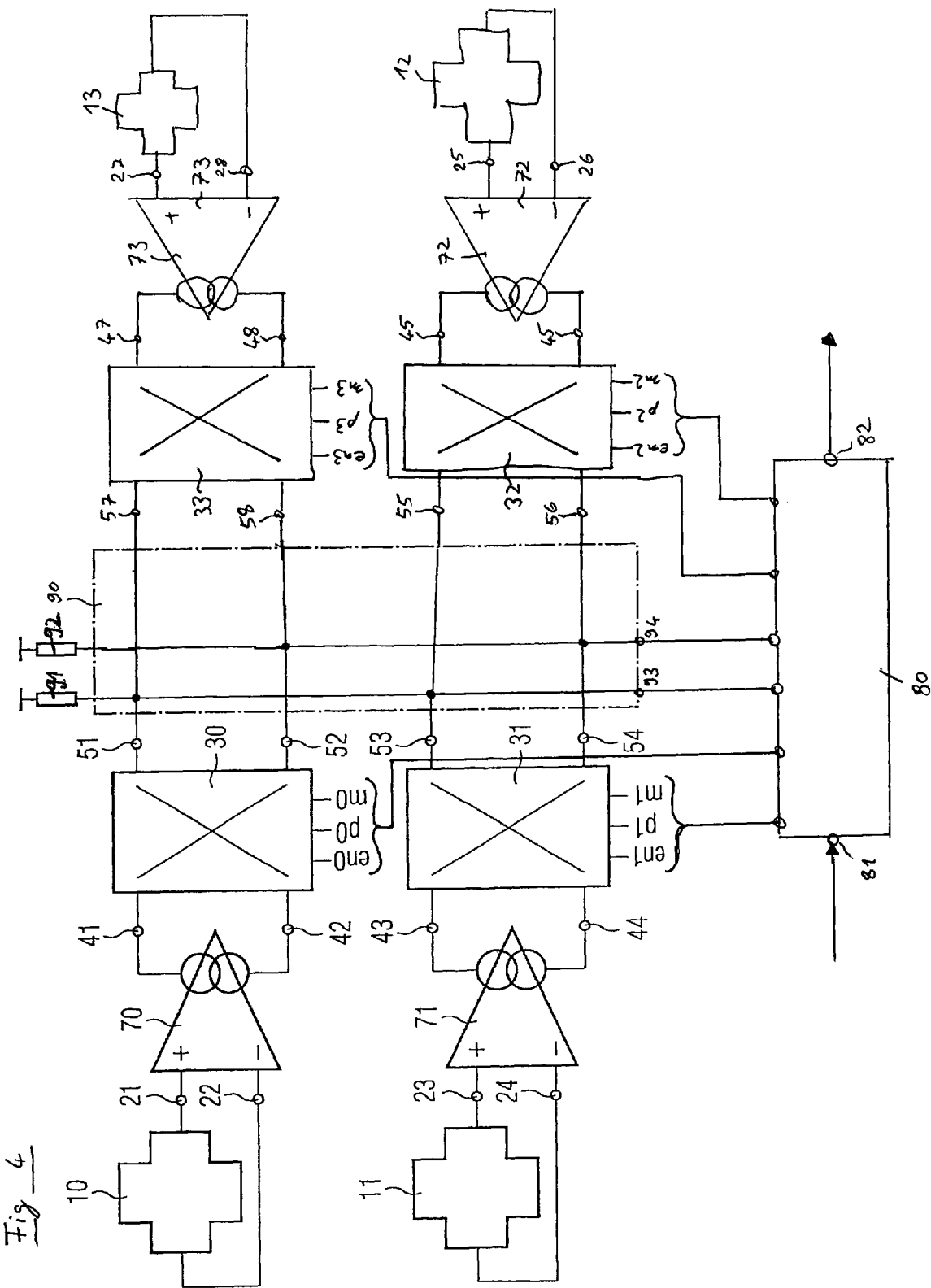
FIG. 4 shows an example of a sensor system comprising four sensors and a control circuit according to an embodiment of the invention.

FIG. 4 shows an example of an arrangement according to the present invention comprising four sensors 10, 11, 12 and 13. The first sensor 10 is connected over outputs 21 and 22 to a signal amplifier 70. The signal amplifier is connected to inputs 41 and 42 of a signal modulator 30. The details of the signal modulator 30 and its control unit 60 are not shown in FIG. 4, but could be, for example, identical to those shown in FIG. 3 or integrated into the control circuit 80 described below. Instead, only the control inputs en0, p0, m0 are shown for the signal modulator 30. The other sensors 11, 12 and 13 are connected to identical circuitry.

In order to distinguish the different control signals of different signal modulator 30, 31, 32 and 33, the respective control signals are indexed by postfixes 0, 1, 2 and 3 for the magnetic sensors 10, 11, 12 and 13, respectively. All control signals are provided by a control circuit 80, which in turn comprises a control input 81 and a data output 82, for example in form of a digital data bus.

The outputs 51 and 52, 53 and 54, 55 and 56, 57 and 58 of the signal modulators 30, 31, 32 and 33 respectively are connected in parallel such that the currents provided by all signal modulators 30, 31, 32 and 33 are added up by an adding means 90, such that the voltage measured at two resistors 91 and 92 is proportional to the total current provided by all signal modulators outputs. This voltage is also provided via outputs 93 and 94 to the control unit 80.

By sending an appropriate control signal to the control input 81, the control circuit 80 is switched into an alignment mode of operation. In this mode, all signal modulators 30, 31, 32 and 33 are provided with identical control signals en, p and m, such that either all signal modulators 30, 31, 32 and 33 are switched into the first or positive state (+) or all signal modulators 30, 31, 32 and 33 are switched into the second or negative state (−). Thus, in this mode, the signals provided by all sensors are added up in order to provide an average magnetic field strength.

Figure 5A:
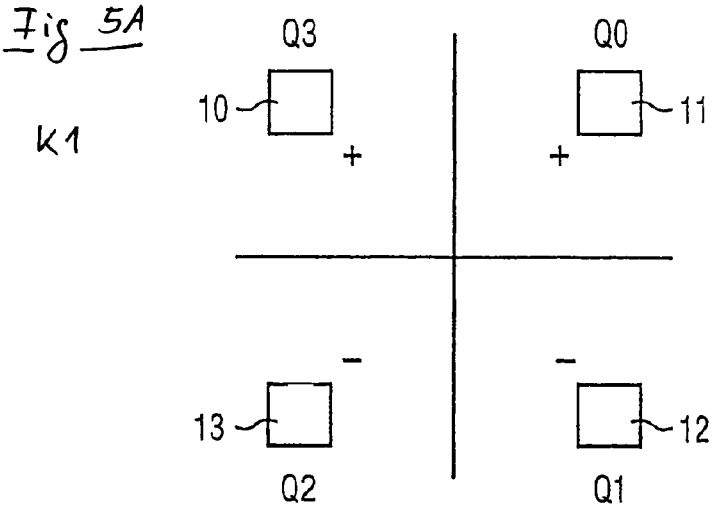
FIG. 5A shows a first configuration of a sensor arrangement.
Figure 5B:
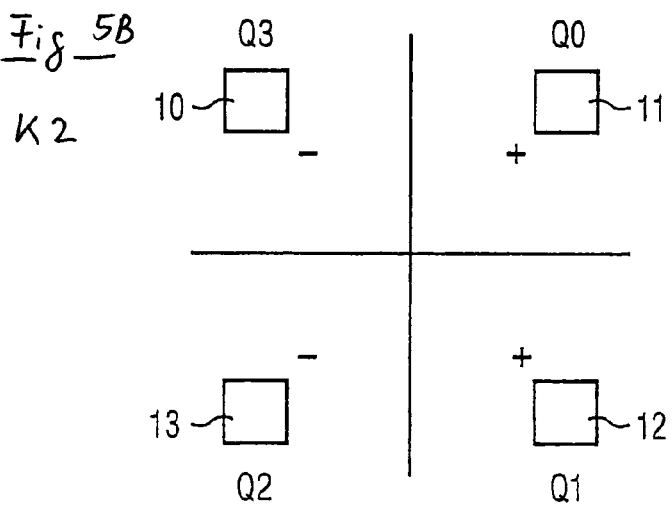
FIG. 5B shows a second configuration of a sensor arrangement.
Figure 5C:
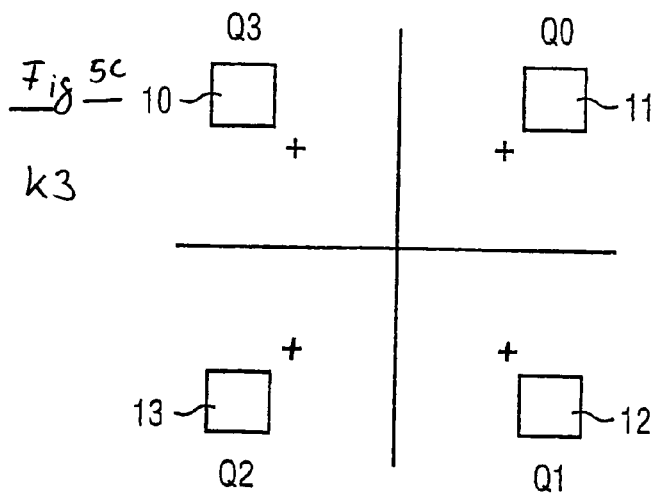
FIG. 5C shows a third configuration of a sensor arrangement.

FIGS. 5A to 5C show three different configurations of the sensor arrangement of FIG. 2 indicated by different states of the signal modulators 30, 31, 32 and 33 respectively. The associated sensors 10, 11, 12 and 13 are placed in a plane with quadrants Q3, Q0, Q2 and Q1 respectively.

In the configuration K1 shown in FIG. 5A, the signal modulators 30 and 31 of quadrant Q3 and Q0 are switched into their positive state (+), i.e. they pass through the sensor signal from sensors 10 and 11 unchanged, whereas the signal modulators 32 and 33 are switched into their negative state (−), i.e. they invert the signals from the sensors 12 and 11 before they are passed on to the adding means 90.

With $G_{Hall}$ as electrical amplification factor of the Hall sensor 10, the amplitude of the magnetic field $B_{10}$ of the sensor 10 is given by the following equation and depends on the angle α:

$$B_{10} = B0 \cdot \sin(\alpha).$$

Thus, in the first configuration K1 shown in FIG. 5A, the total system signal of all sensors 10, 11, 12 and 13 provided to the signal outputs 93 and 94 is equal to:

$$V_{K1} = B0 \cdot G_{Hall} \cdot (+\sin(\alpha+45) - \sin(\alpha+135) - \sin(\alpha+225) + \sin(\alpha+315)).$$

Conversion results in:

$$V_{K1} = 2\sqrt{2} \cdot B0 \cdot G_{Hall} \sin(\alpha).$$

In a second configuration K2 according to FIG. 5B, the signal modulators 31 and 32 in the quadrants Q0 and Q1 are switched into their positive state (+), while the signal modulators 30 and 33 in the quadrants Q3 and Q2 are switched into their negative state (−).

Calculated in a similar fashion as above, one gets the following system signal:

$$V_{K2} = 2\sqrt{2} \cdot B0 \cdot G_{Hall} \cos(\alpha).$$

Consequently, by switching from the first configuration K1, shown in FIG. 5A, to the second configuration K2, shown in FIG. 5B, and performing the following calculation $$\alpha = \arctan(V_{K1} : V_{K2}),$$

the angular position of the magnet 9 with respect to the sensor arrangement can be computed by the control circuit 80 and output to the data output 82.

In order to allow a fast switching of the signal modulators 30, 31, 32 and 33 and processing of the signals obtained from the signal outputs 93 and 94, the control circuit 80 can contain, for example, registers for outputting control signals and storing data values previously digitized. Whether the required processing is performed by an analog or digital control circuit, a purpose designed circuit or an programmable logic chip like a programmable array logic (PAL) depends on the required system speed and accuracy.

FIG. 5C shows a third configuration of the sensor arrangement. In this configuration all signal modulators 30, 31, 32 and 33 associated with the quadrants Q3, Q0, Q1 and Q2 are configured in their positive state (+). Thus, for a perfectly aligned magnet 9 in the center of all four sensors 10, 11, 12 and 13, the tangential magnetic amplitude of all sensor signals cancel each other out. Thus, the total system signal in this configuration equals $$V_{K3} = B0 \cdot G_{Hall} \cdot (+\sin(\alpha+45) + \sin(\alpha+135) + \sin(\alpha+225) + \sin(\alpha+315))$$

$$V_{K3} = 0,$$

and does not depend on the angle α of the magnet 9 with respect to the sensors 10, 11, 12 and 13. The same holds, if all signal modulators are switched into their negative state (−).

If, however, the magnet 9 is misaligned, i.e. closer to some sensors then to others, the constant B0 is different for each sensor 10, 11, 12 and 13 and consequently the equation for $V_{K3}$ stated above does not hold. In general, the terms contributed by the individual sensors will not cancel each other out. In addition, these terms will be dependent on the angle a of the magnet 9 with respect to the sensor arrangement. The magnet is turned through an arc, stopped, a reading taken, and this is repeated until a full turn has been completed. The selection of the arc is a matter of design choice aimed at providing a reasonable number of measurements, e.g. at least one measurement per sensor of the arrangement. Thus, the configuration shown will have at least four measurements. Further measurements will increase the precision of the result. Thus, by measuring and adding up the signal $V_{K3}$ over a full turn of the magnet 9 around axis z, one can identify a misalignment of the magnet 9.

During alignment, e.g. during manufacturing of an integrated circuit comprising the Hall sensors 10, 11, 12 and 13 and the required control circuits or during set-up of a similar circuit comprising separate components, one can observe the output of the signal output 82 while the magnet 9 is turning. If the measured signal is above a predefined threshold for a full turn, the magnet must be aligned differently for optimal performance, e.g. by shifting it into one direction. After this the measurement will be repeated in general. If the observed misalignment signal is reduced in this new position, the magnet 9 is better aligned then than it was before. Otherwise, a realignment in the opposite direction is required.

The procedure can be repeated iteratively, for example with decreasing realignment step length, until the magnet 9 is aligned in the center of the sensor arrangement or, at least, the measured misalignment is below a predefined threshold value.

Thus, the key factor is signal $V_{K3}$ over a full turn of the magnet. Shifting of the magnet based on $V_{K3}$ can be done simply by trial and error for finding a minimum in the magnetic field strength. More elaborate methods could be employed, of course. However, the disclosed embodiment utilizes a relatively simple hardware for alignment which does not rely on complex computations. For example, FIG. 6 shows a trace where the magnet is moved along the x-axis until it has passed a minimum in that direction. Then, this is repeated in another direction, e.g. the y-direction. This procedure is repeated until the minimum in the center is located.

FIG. 6 shows an example of a trace of a repositioning of the magnet 9 in the plane of the sensor arrangement. Initially the magnet is at location P1 and is displaced to the right and top of the desired position, e.g. the center of the sensor arrangement. Each realignment move of the magnet 9 is indicated by an arrow. In the given example, the magnet 9 is placed at position P6 near the center of the sensor plane after five realignment steps. Of course other forms of misalignments, e.g. tilting of the magnet's axis with respect to the sensor plane or an eccentricity of the rotary axis can also be detected and subsequently corrected.

LIST OF REFERENCES

9 magnet
10-13 sensors
21-28 sensor outputs
30-33 signal modulators
41-48 inputs of the signal modulators
51-58 outputs of the signal modulators
60 control unit
70-73 transconductance amplifiers
80 control circuit
81 control input
82 data output
90 adding means
91, 92 resistors
93, 94 signal outputs
+ positive state of the signal modulators

- negative (inverted) state of the signal modulators
K1 first configuration of the sensor arrangement
K2 second configuration of the sensor arrangement
K3 third configuration of the sensor arrangement
P1 initial position
P6 final position

The invention claimed is:

1. A sensor system for measuring an angle of rotation comprising:
   an arrangement of at least four magnetic sensors, each one outputting a voltage proportional to the strength of a magnetic field measured by a sensor;
   at least four signal modulators, each one connected to one of the magnetic sensors and having at least two control states, the signal modulators being adapted to output, in a first state, a current corresponding to a voltage output by a sensor, and, in a second state, a current corresponding to the inverse of the voltage output by the sensor;
   a means for adding by connecting in parallel the currents output by the signal modulators such that the currents provided by the at least four signal modulators are electrically added up to a total current;
   a diametrically magnetized magnetic source placed in such a way that the magnetic field of the magnet can be sensed by the sensors;
   a data output; and
   a control circuit with at least one control input allowing to switch the control circuit into at least two different modes,
   wherein in a normal mode of operation, the signal modulators are configured in such a way that a signal based on the total current corresponding to the angular position of the diametrically magnetized magnetic source is output to the data output, and
   wherein in an alignment mode of operation, the signal modulators are configured in such a way that a signal based on the total current corresponding to the average magnetic field strength detected by the sensors is output to the data output, such that the position of the diametrically magnetized magnetic source can be aligned with respect to the magnetic sensors.

2. The sensor system according to claim 1, wherein the at least four magnetic sensors are arranged in a plane.

3. The sensor system according to claim 2, wherein the at least four magnetic sensors are arranged in a two-dimensional array of rows and columns.

4. The sensor system according to claim 1, wherein in the normal mode of operation, the magnetic sensors are configured in either a first or a second configuration, said first configuration allows to measure the magnetic field in a first direction and said second configuration allows to measure the magnetic field in a second direction, essentially orthogonal to the first direction, the first and second direction being orthogonal to a rotary axis of the diametrically magnetized magnetic source.

5. The sensor system according to claim 4, wherein in the first configuration, the signal modulators of the first and the second sensor are configured in first state and the signal modulators of the third and fourth sensors are configured in a second state and wherein, in the second configuration, the signal modulators of the second and the third sensors are configured in the first state and the signal modulators of the first and the fourth sensor are configured in the second state.

6. The sensor system according to claim 1, wherein in the alignment mode of operation, the signal modulators of all sensors are configured in the same state, namely all signal modulators are configured in the first state or all signal modulators are configured in the second state.

7. The sensor system according to claim 1, wherein the magnetic sensors are Hall sensors.

8. The sensor system according to claim 1, wherein at least the sensors, the signal modulators, the means for adding and the control circuit are integrated into one integrated circuit.

9. A method for operating a sensor system according to claim 1, wherein the diametrically magnetized magnetic source is aligned by performing the steps of:
   sending an appropriate control signal to the control input of the control circuit to select the alignment mode;
   switching the sensor arrangement into a configuration used for alignment, in which the signal modulators of all sensors are configured in the same state, such that the signals provided by the at least four sensors are added up in order to provide a signal corresponding to the average magnetic field strength that is detected by the sensors;
   repeatedly measuring the average magnetic field using the data output while the diametrically magnetized magnetic source is turning; and
   repeatedly aligning the diametrically magnetized magnetic source with respect to the arrangement of magnetic sensors until the variation in the measured average magnetic field becomes minimal over at least one full rotation of the diametrically magnetized magnetic source.

10. The method according to claim 9, wherein during alignment the diametrically magnetized magnetic source is aligned in such a way that the signal measured at the data output becomes minimal.

11. The method according to claim 9, wherein the alignment of the diametrically magnetized magnetic source comprises at least one of the following:
    an alignment of the position of the magnet in a plane,
    an alignment of the angle of a rotary axis of the magnet, or
    an alignment of the position of the rotary axis of the magnet.

12. The method according to claim 9, wherein the method additionally comprises the steps of:
    selecting the normal mode of operation by sending an appropriate control signal to the control input of the control circuit;
    switching the sensor arrangement into a first configuration;
    measuring and storing the sensor output in the first configuration;
    switching the sensor arrangement into a second configuration;
    measuring and storing the sensor output in the second configuration;
    computing the angular position of the diametrically magnetized magnetic source using the stored measurements obtained in the first and second configuration; and
    outputting a signal corresponding to the angular position of the diametrically magnetized magnetic sources to the data output.

* * * * *